Oct. 21, 1969  H. E. EDGERTON  3,473,770

GARDEN HOSE NOZZLE HOLDER

Filed July 19, 1967

HENRY E. EDGERTON
INVENTOR

BY Walter G. Finch
ATTORNEY ated Oct. 21, 1969

United States Patent Office 3,473,770
Patented Oct. 21, 1969

3,473,770
GARDEN HOSE NOZZLE HOLDER
Henry E. Edgerton, 4203 Maine Ave.,
Baltimore, Md. 21207
Filed July 19, 1967, Ser. No. 654,513
Int. Cl. B05b 13/02
U.S. Cl. 248—87                                1 Claim

ABSTRACT OF THE DISCLOSURE

A hose nozzle holder is disclosed which is of the ground spike type. The hose nozzle is received into the open top of a spring clip. The clip is attached to the top of the spike by a peened, square, boss extender, through a correspondingly shaped hole in the clip base. The spike is conical and is cruciform in cross section for a major portion of its length from the pointed end upward.

---

This invention relates generally to holding devices, and more particularly to a support for securing a garden hose nozzle in operative position.

Prior devices of this type have several disadvantages. There is a need for a clip-on support which can be attached and removed while the nozzle is functioning without the necessity of reeving or canting operations. With such an arrangement, the danger of wetting the operator or misdirecting the hose stream is obviated. Further, prior art devices were not dependable with regard to holding a preset azimuth, tending instead to be gradually rotated by the bias of the hose or reaction of the jet stream.

Accordingly, it is an object of this invention to provide an improved garden hose nozzle holder of the ground spike type.

Another object of this invention is to provide a ground spike nozzle support which is easy to implant into the ground and one which resists rotary displacement.

Still another object of this invention is to provide a nozzle support which is attached or removed from the nozzle without reeving or canting the nozzle from a desired attitude.

Other objects and attendant advantages of this invention will become more readily apparent and understood from the following detailed specification and a single sheet of accompanying drawings in which.

Figure 5:
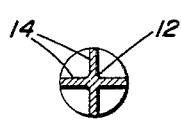
FIG. 5 is a cross section taken on line 5—5 of FIG. 2.

Referring now to the details of the invention, reference numeral 10 indicates generally a hose nozzle holder incorporating features of this invention. This holder 10 consists of a conical spike 12 which has been so forged or machined from the point upward a majority of its length to a cruciform cross section having longitudinal flanges 14 as shown best in FIG. 5.

Figure 1:
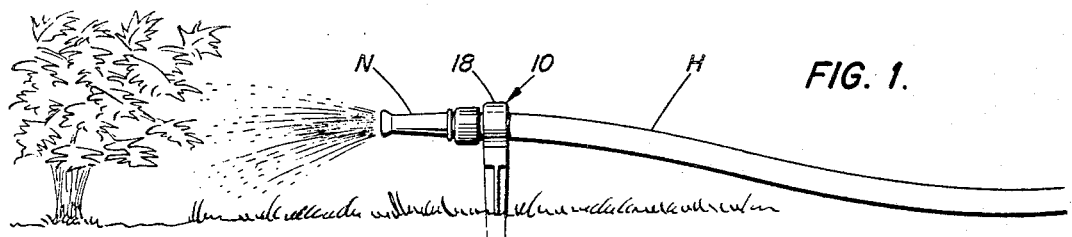
FIG. 1 is a general perspective view of the hose nozzle holder incorporating features of this invention in operational use.
Figure 2:
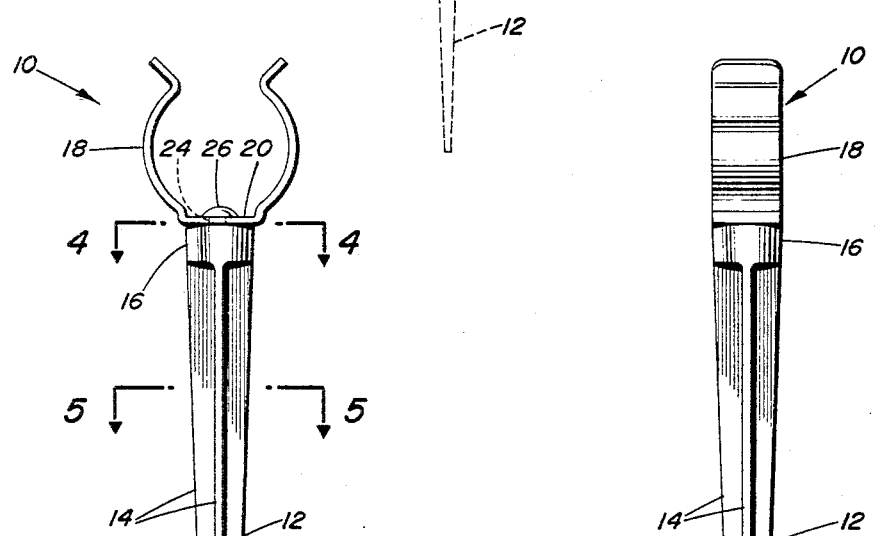
FIG. 2 is a front view of the hose nozzle holder shown approximately full size.
Figure 3:
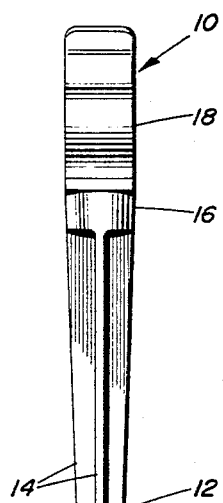
FIG. 3 is a side view, otherwise similar to FIG. 2.
Figure 4:
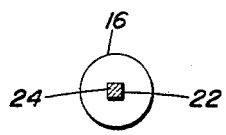
FIG. 4 is a cross section taken on line 4—4 of FIG. 2.

The large end or head 16 of the spike 12 is provided with a raised axial boss 24 of square cross section as shown in FIG. 4. This boss is received in a square hole 22 in the flat base 20 of a clamp 18 and peened over as indicated by reference 26 to retain the latter from rotation relative to the spike 12.

The clamp 18 is open at the top and made of resilient material so as to receive and hold a hose nozzle N which is pressed downwardly therein. The same application of force will also insert the spike into the ground. Because of the flanges 14, the spike 12 resists rotation from ordinary bias of the hose H or reaction force from the jet stream of the nozzle N. It is also easy for a cruciform cross section to enter the ground.

Obviously, many modifications and variations of the present invention are possible in light of the above teachings. It is, therefore, to be understood that, the invention may be practiced otherwise than as specifically described.

What is claimed is:
1. A holder for garden nozzles and the like comprisingk, structure defining a straight spike formed of substantially cruciform cross-section and uniformly tapered throughout its length, with the large end of said spike comprising a conic section having a flat end at right angles to the axis thereof and having centrally a raised axial boss of substantially square cross-section; and a resilient U-shaped clamp for holding an elongated object, said clamp having a flat base fitted to said flat end of the spike, with a squared aperture formed centrally in its base for receiving said boss of said spike and said boss being peened over and protruding above said clamp thereby unifying all said structure.

References Cited

UNITED STATES PATENTS

| | | | |
|---|---|---|---|
| 169,344 | 11/1875 | Edwards | 248—88 |
| 414,881 | 11/1889 | Grams | 248—88 |
| 1,479,943 | 1/1924 | Thompson | 248—88 |
| 1,703,059 | 2/1929 | Carpenter | 248—204 X |
| 2,331,421 | 10/1943 | Redhead | 248—87 X |

CHANCELLOR E. HARRIS, Primary Examiner

U.S. Cl. X.R.
248—156, 204